(12) United States Patent
Cheng

(10) Patent No.: US 11,126,457 B2
(45) Date of Patent: Sep. 21, 2021

(54) METHOD FOR BATCH PROCESSING NGINX NETWORK ISOLATION SPACES AND NGINX SERVER

(71) Applicant: Xiamen Wangsu Co., Ltd., Xiamen (CN)

(72) Inventor: Duyong Cheng, Xiamen (CN)

(73) Assignee: Xiamen Wangsu Co., Ltd., Xiamen (CN)

( * ) Notice: Subject to any disclaimer, the term of this patent is extended or adjusted under 35 U.S.C. 154(b) by 0 days.

(21) Appl. No.: 16/814,707

(22) Filed: Mar. 10, 2020

(65) Prior Publication Data

US 2020/0285506 A1  Sep. 10, 2020

Related U.S. Application Data

(63) Continuation of application No. PCT/CN2019/081534, filed on Apr. 4, 2019.

(30) Foreign Application Priority Data

Mar. 8, 2019 (CN) .......................... 201910176726.3

(51) Int. Cl.
*G06F 15/177* (2006.01)
*G06F 9/46* (2006.01)
(Continued)

(52) U.S. Cl.
CPC .......... *G06F 9/466* (2013.01); *H04L 41/0803* (2013.01); *H04L 47/827* (2013.01); *H04L 67/42* (2013.01)

(58) Field of Classification Search
CPC ... H04L 41/0803; H04L 47/827; H04L 67/42; G06F 9/466
See application file for complete search history.

(56) References Cited

U.S. PATENT DOCUMENTS 10,142,204 B2 * 11/2018 Nickolov ............ H04L 43/0817
2005/0193023 A1 * 9/2005 Ismail ................ H04N 21/4147
(Continued)

FOREIGN PATENT DOCUMENTS

| CN | 104991815 A | 10/2015 |
|---|---|---|
| CN | 107678836 A | 2/2018 |
| CN | 109347652 A | 2/2019 |

OTHER PUBLICATIONS

International Search Report mailed in International Patent Application No. PCT/CN2019/081534, filed on Apr. 4, 2019, 4 pages.

(Continued)

*Primary Examiner* — Razu A Miah
(74) *Attorney, Agent, or Firm* — Davis Wright Tremaine LLP

(57) ABSTRACT

The present disclosure relates to a method for batch processing nginx network isolation spaces and an nginx server. The method includes: allocating unique identifiers to the respective network isolation spaces, and setting configuration files of the respective network isolation spaces (S1); receiving a control command transmitted by an nginx controller, herein the control command carries a plurality of unique identifiers pointing to the network isolation spaces (S3); and batch processing the network isolation spaces that the plurality of unique identifiers respectively point to and configuration files of the network isolation spaces pointed to according to the control command (S5). The technical solutions provided in the present disclosure may batch process the network isolation spaces in the nginx.

18 Claims, 3 Drawing Sheets

(51) Int. Cl.
*H04L 12/911* (2013.01)
*H04L 12/24* (2006.01)
*H04L 29/06* (2006.01)

(56) References Cited

U.S. PATENT DOCUMENTS

| | | | |
|---|---|---|---|
| 2009/0097437 A1* | 4/2009 | Sutivong | H04L 1/0675 370/328 |
| 2012/0147894 A1* | 6/2012 | Mulligan | H04L 41/5048 370/395.53 |
| 2014/0025827 A1* | 1/2014 | Konuk | H04L 67/10 709/226 |
| 2014/0173061 A1* | 6/2014 | Lipstone | H04L 41/5041 709/220 |
| 2014/0173062 A1* | 6/2014 | Lipstone | H04L 67/16 709/220 |
| 2014/0173066 A1* | 6/2014 | Newton | H04L 65/403 709/221 |
| 2014/0173132 A1* | 6/2014 | Varney | H04L 67/06 709/240 |
| 2014/0280759 A1* | 9/2014 | Cameron | H04L 67/06 709/219 |
| 2015/0082378 A1* | 3/2015 | Collison | H04L 67/10 726/1 |
| 2015/0089034 A1* | 3/2015 | Stickle | H04L 41/18 709/223 |
| 2015/0237132 A1* | 8/2015 | Antony | H04L 67/1095 709/224 |
| 2015/0281098 A1* | 10/2015 | Pettit | H04L 45/64 370/235 |
| 2017/0104718 A1* | 4/2017 | Folco | H04L 63/0209 |
| 2017/0199770 A1* | 7/2017 | Peteva | G06F 9/5088 |
| 2017/0244672 A1* | 8/2017 | Shulman | H04L 12/4633 |
| 2018/0063143 A1* | 3/2018 | Wilson | H04L 67/32 |
| 2018/0210808 A1* | 7/2018 | Shanmugam | H04L 41/5067 |
| 2019/0179726 A1* | 6/2019 | Hou | G06F 11/3006 |

OTHER PUBLICATIONS

Extended European Search Report dated Mar. 12, 2021, Patent Application No. 19853268.1, 8 pages.
Memon, "3 Ways to Automate with NGINX and NGINX Plus," Nginx, https://www.nginx.com/blog/3-ways-to-automate-nginx-nginx-plus, Jul. 22, 2016, 5 pages.
Whiteley, "Three Ways NGINX Scales Applications Running in Docker Containers," Nginx, https://www.nginx.com/blog/three-waysnginx-scales-applications-running-in-docker-containers/, Jun. 8, 2018, 5 pages.

* cited by examiner

METHOD FOR BATCH PROCESSING NGINX NETWORK ISOLATION SPACES AND NGINX SERVER

CROSS REFERENCE TO RELATED APPLICATIONS

The present disclosure is a continuation of International Application No. PCT/CN2019/081534, filed on Apr. 4, 2019, entitled "METHOD FOR BATCH PROCESSING NGINX NETWORK ISOLATION SPACES AND NGINX SERVER" which is based on and claims priority to Chinese Patent Application No. 201910176726.3, filed on Mar. 8, 2019, entitled "METHOD FOR BATCH PROCESSING NGINX NETWORK ISOLATION SPACES AND NGINX SERVER," the disclosures of which are incorporated herein by reference in their entirety.

TECHNICAL FIELD

The present disclosure relates to the field of Internet technology, especially to a method for batch processing nginx network isolation spaces and an nginx server.

BACKGROUND

With the rise of cloud computing technology, computing resources in a network can be provided to users as shared resources, so that computing tasks with higher difficulty can be completed through powerful computing capabilities. In order to provide network users with separate computing resources, the different network users can usually be network-isolated. Under Linux system, network isolation can be implemented in an nginx server. Specifically, in a native nginx, different processes can be set to process different configuration files, but each process needs to be separately set, reloaded and so on, thereby occupying more system resources. In view of this, a technology for virtualizing the native nginx is generated in the prior art. After the virtualization, different processes can correspond to separate configuration files. In this way, when a certain network isolation space needs to be modified, a configuration file corresponding to the network isolation space can be directly modified without affecting normal operation of other network isolation spaces.

However, when the virtualized nginx is processing the network isolation space, a native nginx manner is still used. Therefore, each network isolation space can be processed separately, which cannot realize more efficient batch processing.

SUMMARY

The present disclosure is directed to provide a method for batch processing nginx network isolation spaces and an nginx server, which may batch process network isolation spaces in the nginx.

In order to realize the above-described objective, the present disclosure provides a method for batch processing nginx network isolation spaces. A plurality of network isolation spaces are provided in an nginx server. The method comprises: allocating unique identifiers to the respective network isolation spaces, and setting configuration files of the respective network isolation spaces; receiving a control command transmitted by an nginx controller, where the control command carries a plurality of unique identifiers pointing to the network isolation spaces; and batch processing the network isolation spaces that the plurality of unique identifiers respectively point to and configuration files of the network isolation spaces pointed to according to the control command.

In order to realize the above-described objective, the present disclosure further provides an nginx server, where a plurality of network isolation spaces are provided. The nginx server comprises: a space information configuration unit configured to allocate unique identifiers to the respective network isolation spaces, and set configuration files of the respective network isolation spaces; a control command receiving unit configured to receive a control command transmitted by an nginx controller, where the control command carries a plurality of unique identifiers pointing to the network isolation spaces; and a batch processing unit configured to batch process the network isolation spaces that the plurality of unique identifiers respectively point to and configuration files of the network isolation spaces pointed to according to the control command.

In order to realize the above-described objective, the present disclosure, still further, provides an nginx server including a memory and a processor, the memory being configured to store a computer program which, when executed by the processor, implements the above-described method for batch processing the nginx network isolation spaces.

It can be seen from the above that the technical solutions provided by the present disclosure may allocate unique identifiers to the respective network isolation spaces in the nginx server, and may set a configuration file for each of the network isolation spaces. When the network isolation spaces are to be processed, the nginx controller may send a control command which may carry a plurality of unique identifiers pointing to the network isolation spaces. After the nginx server receives the control command carrying the unique identifiers, the network isolation spaces that the plurality of unique identifiers respectively point to and configuration files of the network isolation spaces pointed to may be batch processed according to the control command. It can be seen that the technical solution provided by the present disclosure may allocate unique identifiers to the network isolation spaces, and may set separate configuration files, and subsequently, unique identifiers of a plurality of network isolation spaces may be added in the control command, thereby implementing batch processing the plurality of network isolation spaces and the configuration files thereof.

BRIEF DESCRIPTION OF THE DRAWINGS

In order to describe the technical solutions of the embodiments of the present application more clearly, drawings used in description of the embodiments will be briefly described below. It is evident that the drawings in the following description are only some embodiments of the present disclosure. For those skilled in the art, other drawings may also be obtained from those drawings without an inventive effort.

DETAILED DESCRIPTION

In order to make the objective, technical solutions and advantages of the present application clearer, embodiments of the present disclosure will be further described in detail below with reference to the accompanying drawings.

Figure 1:
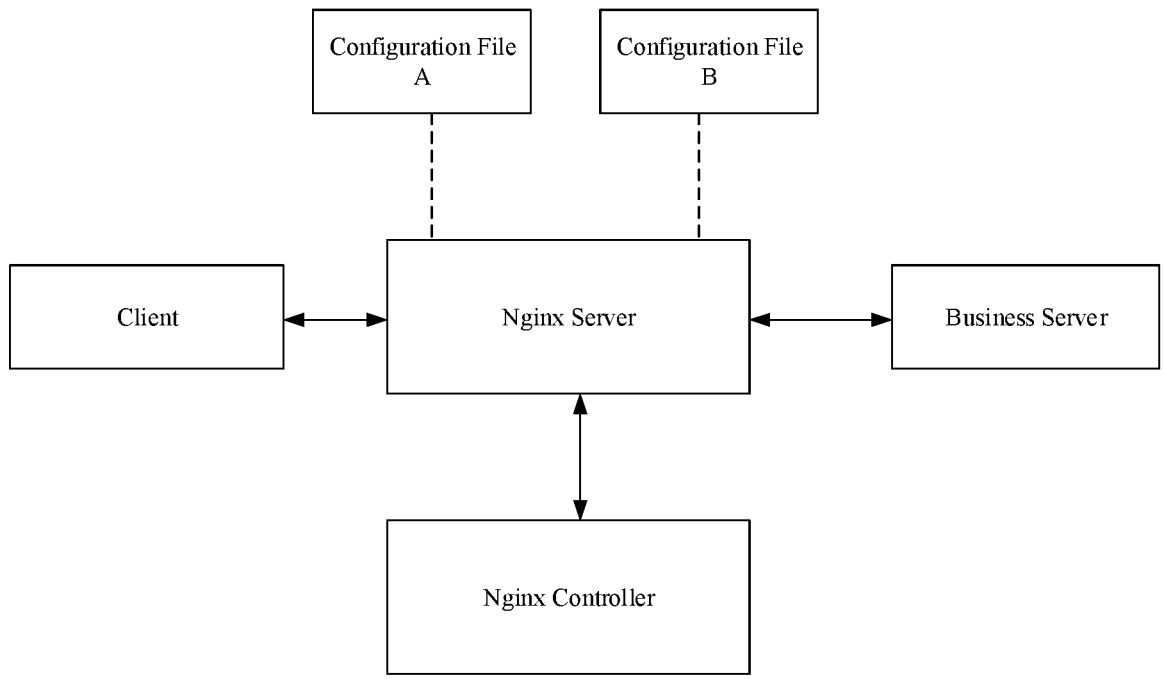
FIG. 1 is a schematic structural diagram of an nginx system in an embodiment of the present disclosure.

The present disclosure provides a method for batch processing nginx network isolation spaces, and the method may be applied to an nginx server. With reference to FIG. 1, a client may communicate with a business server through the nginx server. The nginx server may be connected to an nginx controller which may send various control commands to the nginx server. In the nginx server, a plurality of network isolation spaces may be preset, and these network isolation spaces may be divided based on the User-space TCP/IP stack technology.

It shall be noted that, in the existing technology, when the network isolation spaces are being divided based on the kernel mode technology, an nginx application running on each of the network isolation spaces needs to correspond to one process. Therefore, as the quantity of the network isolation spaces increases, processes required in the nginx server also increase, which increases load of the nginx server. However, in the present application, when the network isolation spaces are being divided based on the User-space TCP/IP stack technology, a plurality of network isolation spaces may be divided in the same process, and a corresponding nginx application may run in each of the network isolation spaces. In this way, not only the plurality of network isolation spaces may be uniformly managed by a single process, but overhead of the process of the nginx server may be saved.

In addition, in an nginx server implemented by the kernel mode technology, when a physical network adapter receives a data packet transmitted by an external device, the data packet usually needs to be copied into a kernel system, and then copied from the kernel system into the nginx application. That is, the nginx server implemented based on the kernel mode technology usually requires a procedure of copying the data packets a plurality of times. By comparison, in an nginx server implemented by User-space TCP/IP stack technology, when the physical network adapter receives the data packet transmitted by the external device, the nginx application may directly obtain the data packet from the physical network adapter, thereby avoiding the plurality of times of copying of the data packet, and further saving the overhead of the nginx server.

Figure 2:
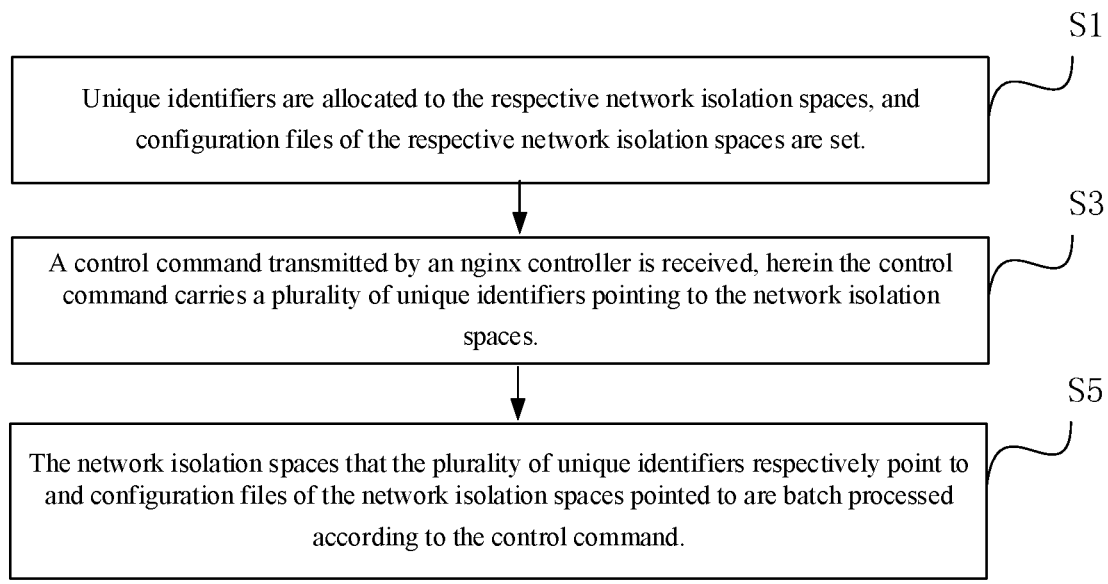
FIG. 2 is a flowchart of a method for batch processing nginx network isolation spaces in an embodiment of the present disclosure.

With reference to FIG. 2, the method for batch processing the nginx network isolation spaces provided in the present disclosure may include the following steps.

S1: Unique identifiers are allocated to the respective network isolation spaces, and configuration files of the respective network isolation spaces are set.

In this embodiment, with respect to the plurality of network isolation spaces in the nginx server, the respective network isolation spaces may be allocated with unique identifiers which may be used as names of the network isolation spaces. Besides, the respective network isolation spaces may be set with configuration files which may include user information corresponding to the network isolation space such as a network address, port information, a maximum quantity of connections, a connection timeout, an IP information of an http server connected to the nginx and the like. In practical applications, a unique identifier may be a unique character string calculated according to a hash algorithm, or may be a randomly generated string of numbers, or may be a pointer that is not repeated, or may be a file name of an unrepeated configuration file.

In this embodiment, when setting the configuration files of the network isolation spaces, the foregoing enumerated information needs to be determined in the configuration files, and the information may be used as a resource required for the network isolation spaces to run normally. In the existing nginx system, types of resources used by the respective network isolation spaces may be set together in one preset configuration file. The types of the resources, for example, may include at least one of a monitor IP address, a monitor port identifier, a process identifier file, a webpage storage location, a webpage title, a maximum quantity of connections, an interval time of transmitting a heartbeat packet and a certificate storage location. Naturally, in practical applications, the resource types may include more or less types according to what is required. In the existing technology, only a limited quantity of resource types such as the monitor IP address and the maximum quantity of connections in the preset configuration file may be split according to the network isolation spaces. In this embodiment, however, in order to set a corresponding configuration file for a network isolation space created, most of the resource types in the preset configuration file may be split. Specifically, when setting a configuration file for the current network isolation space created, the resource type required for the current network isolation space may be determined in advance, and then the resource type required for the current network isolation space may be obtained by splitting the resource types recorded in the preset configuration file. It shall be noted that since the preset configuration file only records resource types rather than real resources, a resource type obtained by splitting the preset configuration file is not erased from but remains in the preset configuration file. In this way, repetitive resource types may be obtained when required resource types are obtained by splitting the preset configuration file for a plurality of varied network isolation spaces. When the resource type required for the current network isolation space is obtained by splitting the preset configuration file, the split resource type may be set in the configuration file of the current network isolation space, thereby completing the setting process of the configuration file.

It can be seen from the above described that network resource spaces may be represented by unique identifiers. Therefore, when the resource types are split for the respective network isolation spaces, it may be considered as performing resource splitting on the preset configuration file by the unique identifiers within the nginx application, and eventually each unique identifier has an independent resource type. At the same time, because the same resource type may be split for a plurality of varied network isolation spaces, there may be repetitive contents between the respective configuration files.

In the existing technology, the network isolation spaces and nginx processes are in one-to-one correspondence and each nginx process is only responsible for its corresponding network isolation space in a virtualized nginx application. As a result, much process resources may be wasted upon starting up configuration files of the respective network isolation spaces or upon executing other operations. In view of this, in an embodiment of the present application, after setting the configuration files of the respective network isolation spaces, a single nginx process may be created, and the configuration files of the plurality of network isolation spaces are managed by the single nginx process. That is, in this embodiment, no separate nginx process is set for each network isolation space, but a single nginx process is used for managing a plurality of created network isolation spaces and their configuration files. In this way, the single nginx process may be used to batch starting up the configuration files of the plurality of network isolation spaces, thereby avoiding waste of process resources caused by starting up the plurality of configuration files.

S3: A control command transmitted by an nginx controller is received. The control command carries a plurality of unique identifiers pointing to the network isolation spaces.

In this embodiment, when a new network isolation space needs to be created, or a network isolation space already created needs to be performed operation such as deletion, reloading and the like, a corresponding control command may be generated by the nginx controller. In practical applications, the control command usually has a certain format which may be preset between the nginx controller and the nginx server. Specifically, the format may define that the control command includes at least three types of information: a preset standard character, a command descriptor for representing an operation type, and a unique identifier of a network isolation space. Herein, the preset standard character may be used to represent that the data type currently transmitted by the nginx controller is a control command, and the preset standard character may be, for example, nginx cmd. The command descriptor for representing an operation type may be expressed in different ways according to different operation types. For example, for creating a new network isolation space, a corresponding command descriptor may be add netns; for deleting a network isolation space already created, a corresponding command descriptor may be del netns; and for re-loading a network isolation space already created, a corresponding command descriptor may be reload netns. The unique identifier may be used as an object to which the control command is directed. If the control command processes merely one network isolation space, only one unique identifier may be carried in the control command. However, if the control command needs to batch process a plurality of network isolation spaces, the control command needs to carry unique identifiers of the respective network isolation spaces to be processed. For example, currently, two network isolation spaces with unique identifiers ns1 and ns2 need to be batch reloaded, and then a generated control command may be:

nginx_cmd reload_netns <ns1><ns2>

Naturally, the preset standard character and the command descriptor and the like involved in the components of the above-described preset format are only examples for facilitating illustration of the technical solutions of the present application, but do not mean that the technical solutions of the present application are limited to the above-exemplified preset standard characters and command descriptors. Besides, the components of the preset format may be pre-arranged to be in other formats by the nginx controller and the nginx server according to practical conditions, to which the present application does not impose any limitation.

S5: The network isolation spaces that the plurality of unique identifiers respectively point to and configuration files of the network isolation spaces pointed to are batch processed according to the control command.

In this embodiment, after receiving the control command, the nginx server may analyze the command descriptors and unique identifiers therein to determine what operations shall be performed on which network isolation resource(s). Herein, if the control command carries only one unique identifier, the network isolation space that the unique identifier points to and the configuration file of the network isolation space pointed to may be processed separately according to the control command, so as not to affect other network isolation spaces and configuration files. If the control command carries a plurality of unique identifiers, the network isolation spaces that the plurality of unique identifiers respectively point to and the configuration files of the network isolation spaces pointed to may be batch processed according to the control command. In this way, one control command may be used to batch process a plurality of network isolation spaces, so that the defect that the respective network isolation spaces have to be processed separately in the native nginx manner in the existing technology is removed.

Figure 3:
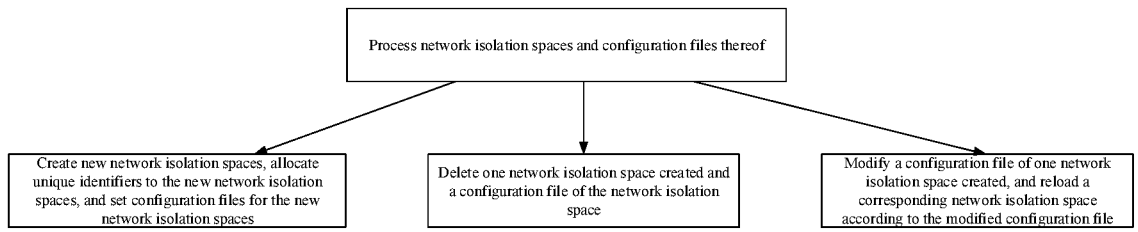
FIG. 3 is a schematic diagram of a plurality of processing methods for network isolation spaces and configuration files of the network isolation spaces in an embodiment of the present application.

In practical applications, no matter whether batch processing or separate processing is performed, the network isolation spaces and the configuration files may be processed in a plurality of manners. Specifically, with reference to FIG. 3, processing manners may include creating a new network isolation space, allocating a unique identifier to the new network isolation space, and setting a configuration file of the new network isolation space. In addition, a network isolation space that has already been created and a configuration file of the network isolation space may be deleted. In addition, a configuration file of a network isolation space already created may be modified, and the network isolation space may be reloaded according to the modified corresponding configuration file. The above-described three processing modes may respectively correspond to add netns, del netns, and reload netns in the above-exemplified control command.

In this embodiment, new network isolation spaces may be created in the nginx server, unique identifiers carried in the control command may be allocated to the new network isolation spaces, and configuration files for the new network isolation spaces may be set, if the control command is a creating or adding command that represents creating the new network isolation spaces. Specifically, after received the control command, the nginx server may identify the quantity of unique identifiers carried in the control command, and create an equal quantity of new network isolation spaces in the nginx server according to the identified quantity. For example, if the control command carries two unique identifiers, the nginx server may create two new network isolation spaces. Then, the unique identifiers carried in the control commands may be sequentially allocated to each of the new network isolation spaces created. For example, if the two unique identifiers carried in the control command are ns1 and ns2, the unique identifiers of the two new network isolation spaces created may be ns1 and ns2.

In one embodiment, if the control command is a deleting command that represents deleting a network isolation space, the nginx server may delete one or more network isolation spaces already created and delete configuration files of the one or more network isolation spaces according to the control command. Specifically, the nginx server may identify each unique identifier carried in the control command, determine target network isolation spaces respectively pointed to by the respective unique identifiers, and then delete the target network isolation spaces and delete the configuration files of the target network isolation spaces.

In one embodiment, after modification is performed on the configuration file of a certain network isolation space, the configuration file before the modification and the configuration file after the modification may be simultaneously stored. Therefore, if the configuration file of a certain network isolation space has been modified, the network isolation space may correspond to two versions of the configuration file. Herein, the configuration file before the modification may be used as the initial configuration file, and the modified configuration file may be used as a current configuration file. Then, if the control command received by the nginx server is a reloading command that represents reloading the network isolation space, the current configuration file of the target network isolation space pointed to by the reloading command may be obtained, and the current configuration file and the initial configuration file may be compared. If there is no change between contents of the current configuration file and that of the initial configuration file, it means that the network isolation space does not need to be reloaded at this time, so that the current reloading operation may be abandoned. If there is a change between the contents of the current configuration file and that of the initial configuration file, the reloading operation may be performed on the target network isolation space according to the current configuration file.

In one embodiment, when a plurality of configuration files created need to be batch deleted or batch reloaded, in order to improve efficiency of batch processing, the plurality of configuration files may be stored under the same target directory. In this way, a corresponding deleting or reloading command may be issued in regard to the target directory, thereby implementing batch processing of all the configuration files under the target directory. In other words, when the control command carries a plurality of unique identifiers, configuration files of the network isolation spaces respectively pointed to by the plurality of unique identifiers may be stored under the same target directory, and the configuration files under the target directory may be batch processed.

In this embodiment, since the configuration files of the plurality of network isolation spaces are managed by the single nginx process, the plurality of network isolation spaces may be batch processed according to the control command, in addition to that the single nginx process may be used to batch start up the configuration files of the plurality of network isolation spaces, thereby improving efficiency of batch processing.

With reference to FIG. 1, in one embodiment, the nginx server may have configuration files of a plurality of network isolation spaces, for example, configuration file A and configuration file B in FIG. 1. Then timing of loading these configuration files may also be determined according to the practical conditions. Specifically, configuration files of the respective network isolation spaces may be loaded when the nginx server is being initialized. Alternatively, when the nginx server is running, a loading command transmitted by the nginx controller may be received, and the configuration files of the network isolation spaces pointed to by the loading command may be loaded.

Figure 4:
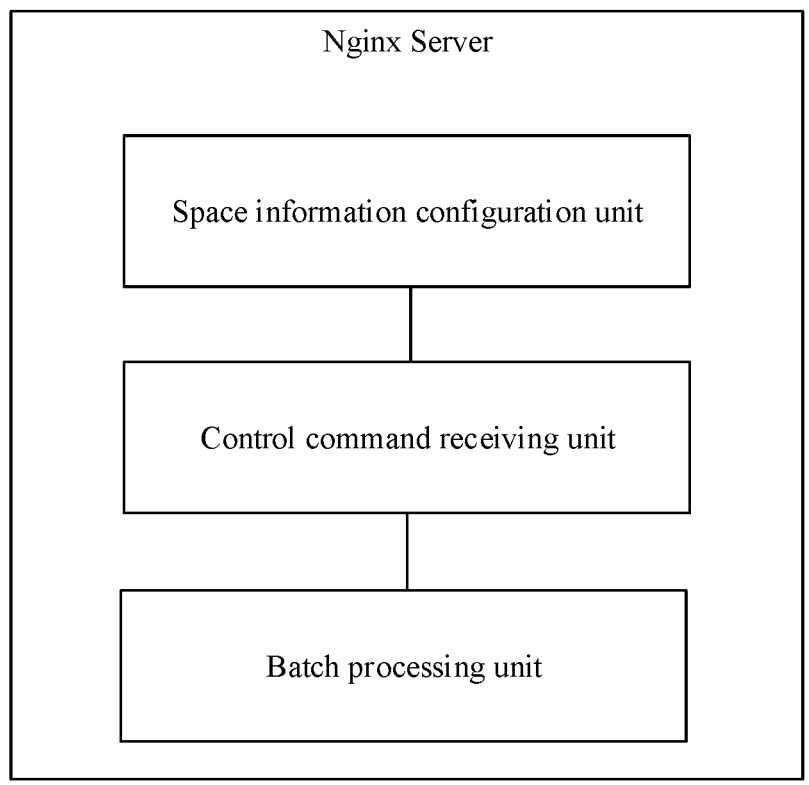
FIG. 4 is a schematic diagram of functional modules of an nginx server in an embodiment of the present disclosure.

With reference to FIG. 4, the present disclosure further provides an nginx server provided with a plurality of network isolation spaces, and the nginx server includes:

a space information configuration unit configured to allocate unique identifiers to the respective network isolation spaces, and set configuration files of the respective network isolation spaces;

a control command receiving unit configured to receive a control command transmitted by an nginx controller, herein the control command carries a plurality of unique identifiers pointing to the network isolation spaces; and a batch processing unit configured to batch process the network isolation spaces that the plurality of unique identifiers respectively point to and configuration files of the network isolation spaces pointed to according to the control command.

In one embodiment, the batch processing unit includes:
a creating module configured to create new network isolation spaces in the nginx server, allocate unique identifiers carried in the control command to the new network isolation spaces, and set configuration files for the new network isolation spaces, when the control command is a creating or adding command that represents creating the new network isolation spaces.

In one embodiment, the batch processing unit includes:
a deleting module configured to delete one or more of the network isolation spaces created and delete the configuration files of the one or more network isolation spaces in the nginx server according to the control command, when the control command is a deleting command that represents deleting network isolation spaces.

In one embodiment, the batch processing unit includes:
a comparing module configured to acquire current configuration files of a target network isolation spaces pointed to by a reloading command, and compare the current configuration files with initial configuration files of the target network isolation spaces, when the control command is the reloading command that represents reloading the network isolation space;
a reloading module configured to perform a reloading operation on the target network isolation spaces according to the current configuration files, when there is a change to contents of the current configuration files as compared with contents of the initial configuration files.

In one embodiment, the batch processing unit includes:
a directory storing unit configured to store the configuration files of the network isolation spaces respectively pointed to by the plurality of unique identifiers under one target directory, and batch process each of the configuration files under the target directory.

In one embodiment, the nginx server further includes:
a single process creating unit configured to create a single nginx process, and manage the configuration files of the plurality of network isolation spaces by using the single nginx process; and
correspondingly, the batch processing unit further configured to batch start up the configuration files of the plurality of network isolation spaces by using the single nginx process, and batch process the plurality of network isolation spaces according to the control command.

Figure 5:
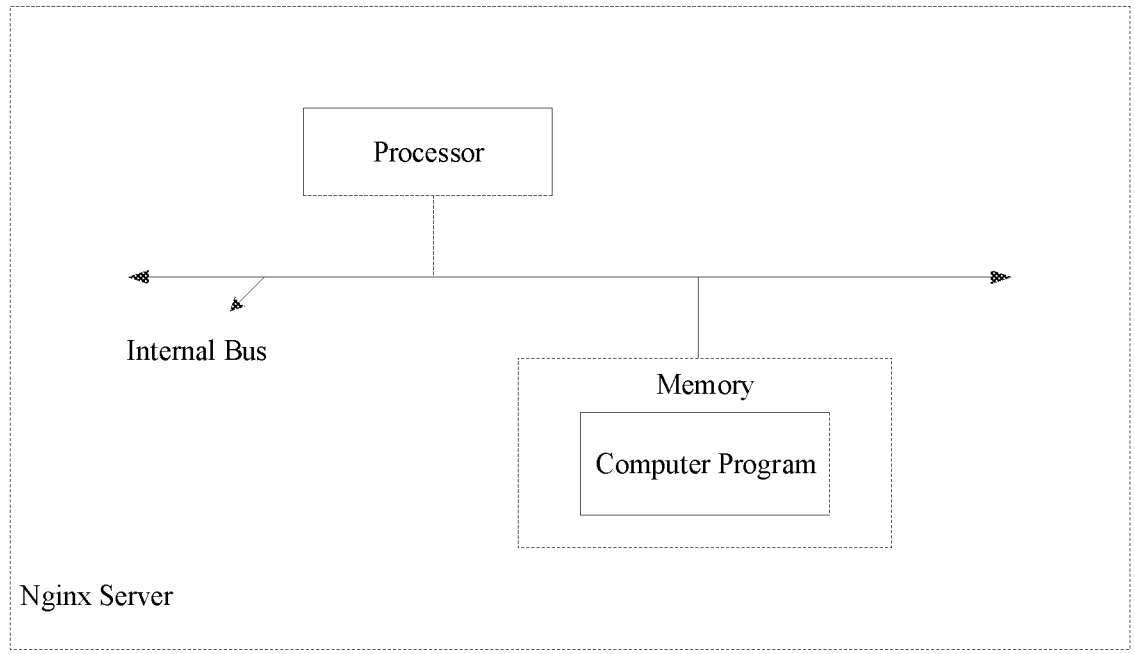
FIG. 5 is a schematic structural diagram of an nginx server in an embodiment of the present disclosure.

With reference to FIG. 5, the present disclosure further provides an nginx server including a memory and a processor. The memory is configured to store a computer program which, when executed by the processor, implements the above-described method for batch processing the nginx network isolation spaces.

Figure 6:
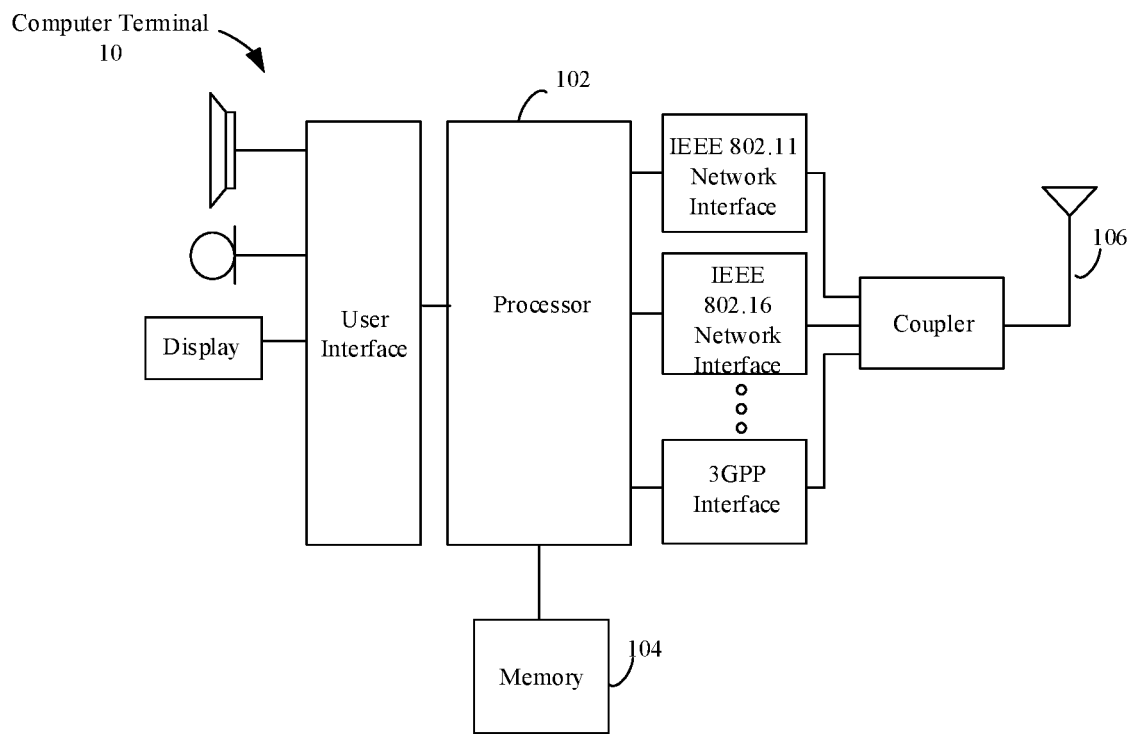
FIG. 6 is a schematic structural diagram of a computer terminal in the present disclosure.

With reference to FIG. 6, in the present disclosure, the technical solution in the above embodiment may be applied to a computer terminal 10 as shown in FIG. 6. The computer terminal 10 may include one or more (only one is shown in the figure) processor(s) 102 (the processor(s) 102 may be, but is not limited to, a processing device like a microprocessor MCU or a programmable logic device FPGA), memory(ies) 104 for storing data and transmission module(s) 106 for communication functions. Those skilled in the art may understand that the structure shown in FIG. 6 is merely illustrative but does not impose a limitation to the structure of an electronic device described above. For example, the computer terminal 10 may further include more or fewer components than those shown in FIG. 6, or have a different configuration than that shown in FIG. 6.

The memory 104 may be used to store software programs and modules of application software, and the processor 102 executes various functional application and data processing by running software programs and modules stored in the memory 104. The memory 104 may include a high-speed random access memory, and may also include a non-volatile memory such as one or more magnetic memory device(s), flash memory(ies), or another (other) non-volatile solid-state memory(ies). In some examples, the memory 104 may further include a memory remotely set relative to the processor 102. The memory remotely set may be connected to the computer terminal 10 by a network. Examples of such a network include, but are not limited to, the Internet, an intranet, a local area network, a mobile communication network, and combinations thereof.

The transmission device 106 is used to receive or transmit data via a network. Examples of the above-described network may include a wireless network provided by a communication provider of the computer terminal 10. In one example, the transmission device 106 includes a Network Interface Controller (NIC) that may be connected to other network devices via a base station to communicate with the Internet. In one example, the transmission device 106 may be a radio frequency (RF) module for communicating with the Internet wirelessly.

It can be seen from the above that the technical solutions provided by the present disclosure may allocate unique identifiers to the respective network isolation spaces in the nginx server, and may set a configuration file for each of the network isolation spaces. When the network isolation spaces are to be processed, the nginx controller may send a control command which may carry a plurality of unique identifiers pointing to the network isolation spaces. After the nginx server receives the control command carrying the unique identifiers, the network isolation spaces that the plurality of unique identifiers respectively point to and configuration files of the network isolation spaces pointed to may be batch processed according to the control command. It can be seen that the technical solution provided by the present disclosure may allocate unique identifiers to the network isolation spaces, and may set separate configuration files, and subsequently, unique identifiers of a plurality of network isolation spaces may be added in the control command, thereby implementing batch processing the plurality of network isolation spaces and the configuration files thereof.

On the basis of the description of the above embodiments, those skilled in the art may clearly understand that the embodiments may be implemented by means of software plus necessary general hardware platforms, and naturally, may otherwise be implemented by hardware. On the basis of this understanding, contents of the above-described technical solutions that substantially make contributions or make contributions to the existing technology may be embodied by software products which may be stored in a computer readable memory medium such as an ROM/RAM, a magnetic disc, an optical disc or the like that includes a plurality of instructions that make a computer (i.e., a personal computer, a server, or a network device, etc.) to execute the respective embodiments or the methods described of some parts of the embodiments.

The above-described are only preferred embodiments of the present disclosure, and are not intended to impose a limitation to the present disclosure. Any modifications, equivalent substitutions and improvements, etc., which are included in the spirit and principles of the present application, shall be included in the scope of protection of the present disclosure.

What is claimed is:

1. A method for batch processing nginx network isolation spaces, wherein a plurality of network isolation spaces are provided in an nginx server, the method comprising:
   allocating unique identifiers to respective network isolation spaces, and setting configuration files of the respective network isolation spaces;
   receiving a control command transmitted by an nginx controller, wherein the control command carries a plurality of unique identifiers pointing to the network isolation spaces; and
   batch processing the network isolation spaces that the plurality of unique identifiers respectively point to and configuration files of the network isolation spaces pointed to according to the control command;
   wherein the step of setting configuration files of the respective network isolation spaces comprises:
   selecting a resource type required by a current network isolation space, from resource types recorded in a preset configuration file, and
   setting the resource type in a configuration file of the current network isolation space.

2. The method according to claim 1, wherein the resource types comprise at least one of a monitor IP address, a monitor port identifier, a process identifier file, a webpage storage location, a webpage title, a maximum quantity of connections, an interval time of transmitting a heartbeat packet and a certificate storage location.

3. The method according to claim 1, wherein the step of batch processing the network isolation spaces and the configuration files according to the control command comprises:
   creating new network isolation spaces in the nginx server, allocating unique identifiers carried in the control command to the new network isolation spaces, and setting configuration files for the new network isolation spaces, if the control command is a creating or adding command that represents creating the new network isolation spaces.

4. The method according to claim 3, wherein the step of creating new network isolation spaces in the nginx server and allocating unique identifiers carried in the control command to the new network isolation spaces comprises:
   identifying a quantity of the unique identifiers carried in the control command, creating an equal quantity of new network isolation spaces in the nginx server according to the identified quantity, and sequentially allocating the unique identifiers carried in the control command to the respective new network isolation spaces created.

5. The method according to claim 1, wherein the step of batch processing the network isolation spaces and configuration files according to the control command comprises:
   deleting one or more of the network isolation spaces created and deleting the configuration files of the one or more network isolation spaces in the nginx server according to the control command, if the control command is a deleting command that represents deleting network isolation spaces.

6. The method according to claim 5, wherein the step of deleting one or more of the network isolation spaces created and deleting the configuration files of the one or more network isolation spaces in the nginx server according to the control command comprises:

identifying the unique identifiers carried in the control command, and determining target network isolation spaces pointed to by the unique identifiers respectively, deleting the target network isolation spaces, and deleting the configuration files of the target network isolation spaces in the nginx server.

7. The method according to claim 1, wherein the step of batch processing the network isolation spaces and configuration files according to the control command comprises:
acquiring current configuration files of target network isolation spaces pointed to by a reloading command, and comparing the current configuration files with initial configuration files of the target network isolation spaces, if the control command is the reloading command that represents network isolation space reloading; and
performing a reloading operation on the target network isolation spaces according to the current configuration files, if there is a change to contents of the current configuration files as compared with contents of the initial configuration files.

8. The method according to claim 1, wherein the step of batch processing the network isolation spaces and configuration files according to the control command comprises:
storing the configuration files of the network isolation spaces respectively pointed to by the plurality of unique identifiers under one target directory, and batch processing each of the configuration files under the target directory.

9. The method according to claim 1, wherein, after setting configuration files of the network isolation spaces, the method further comprises:
creating a single nginx process, and managing the configuration files of the plurality of network isolation spaces by using the single nginx process; and
batch starting up, correspondingly, the configuration files of the plurality of network isolation spaces by using the single nginx process, and batch processing the plurality of network isolation spaces according to the control command.

10. The method according to claim 1, wherein the control command at least comprises:
a preset standard character, a command descriptor for representing an operation type, and a unique identifier of a network isolation space.

11. The method according to claim 1, wherein the configuration files of the network isolation spaces are loaded by:
loading the configuration files of the network isolation spaces when the nginx server is being initialized; or
receiving a load command transmitted by the nginx controller, and loading configuration files of the network isolation spaces pointed to by the load command, when the nginx server is running.

12. An nginx server, comprising a memory and a processor, the memory being configured to store a computer program which, when executed by the processor, implements a method for batch processing nginx network isolation spaces, wherein a plurality of network isolation spaces are provided in an nginx server; the method comprising:
allocating unique identifiers to respective network isolation spaces, and setting configuration files of the respective network isolation spaces;
receiving a control command transmitted by an nginx controller, wherein the control command carries a plurality of unique identifiers pointing to the network isolation spaces; and
batch processing the network isolation spaces that the plurality of unique identifiers respectively point to and configuration files of the network isolation spaces pointed to according to the control command;
wherein the step of setting configuration files of the respective network isolation spaces comprises:
selecting a resource type required by a current network isolation space, from resource types recorded in a preset configuration file, and
setting the resource type in a configuration file of the current network isolation space.

13. The nginx server according to claim 12, wherein the step of batch processing the network isolation spaces and the configuration files according to the control command comprises:
creating new network isolation spaces in the nginx server, allocating unique identifiers carried in the control command to the new network isolation spaces, and setting configuration files for the new network isolation spaces, if the control command is a creating or adding command that represents creating the new network isolation spaces.

14. The nginx server according to claim 12, wherein the step of batch processing the network isolation spaces and configuration files according to the control command comprises:
deleting one or more of the network isolation spaces created and deleting the configuration files of the one or more network isolation spaces in the nginx server according to the control command, if the control command is a deleting command that represents deleting network isolation spaces.

15. The nginx server according to claim 12, wherein the step of batch processing the network isolation spaces and configuration files according to the control command comprises:
acquiring current configuration files of target network isolation spaces pointed to by a reloading command, and comparing the current configuration files with initial configuration files of the target network isolation spaces, if the control command is the reloading command that represents network isolation space reloading; and
performing a reloading operation on the target network isolation spaces according to the current configuration files, if there is a change to contents of the current configuration files as compared with contents of the initial configuration files.

16. The nginx server according to claim 12, wherein the step of batch processing the network isolation spaces and configuration files according to the control command comprises:
storing the configuration files of the network isolation spaces respectively pointed to by the plurality of unique identifiers under one target directory, and batch processing each of the configuration files under the target directory.

17. The nginx server according to claim 12, wherein, after setting configuration files of the network isolation spaces, the method further comprises:
creating a single nginx process, and managing the configuration files of the plurality of network isolation spaces by using the single nginx process; and
batch starting up, correspondingly, the configuration files of the plurality of network isolation spaces by using the single nginx process, and batch processing the plurality of network isolation spaces according to the control command.

18. A non-transitory computer readable storage medium storing a computer program, wherein when the computer program is executed by a processor, a step of a method for batch processing nginx network isolation spaces is implemented; wherein a plurality of network isolation spaces are provided in an nginx server; the method comprising:
- allocating unique identifiers to respective network isolation spaces, and setting configuration files of the respective network isolation spaces;
- receiving a control command transmitted by an nginx controller, wherein the control command carries a plurality of unique identifiers pointing to the network isolation spaces; and
- batch processing the network isolation spaces that the plurality of unique identifiers respectively point to and configuration files of the network isolation spaces pointed to according to the control command;
- wherein the step of setting configuration files of the respective network isolation spaces comprises:
- selecting a resource type required by a current network isolation space, from resource types recorded in a preset configuration file, and
- setting the resource type in a configuration file of the current network isolation space.

* * * * *